May 24, 1955   A. CUDOSKY   2,708,990
REVERSIBLE RATCHET DRIVES FOR WHEEL HUBS
Filed Sept. 19, 1949   3 Sheets-Sheet 1

INVENTOR
ANTHONY CUDOSKY
BY Martin J. Finnegan
ATTORNEY

May 24, 1955     A. CUDOSKY     2,708,990
REVERSIBLE RATCHET DRIVES FOR WHEEL HUBS
Filed Sept. 19, 1949     3 Sheets-Sheet 2

INVENTOR
ANTHONY CUDOSKY
BY *Martin J. Finnegan*
ATTORNEY

United States Patent Office 2,708,990
Patented May 24, 1955

2,708,990

REVERSIBLE RATCHET DRIVES FOR WHEEL HUBS

Anthony Cudosky, Ringwood, N. J.

Application September 19, 1949, Serial No. 116,443

3 Claims. (Cl. 192—43.1)

This invention relates to driving mechanisms, and particularly to driving mechanisms wherein the driven element—as, for example, the wheel assembly of a power-driven soil cultivator or other agricultural vehicle—receives driving torque from an engine-driven belt, pulley and reduction gear drive leading to the wheel axle.

In such agricultural units as are now available, there is commonly employed a two-wheeled type including a frame carrying the propelling engine, and having an upwardly-directed extension terminating in hand-grips by which the vehicle may be guided as it rolls along under the impetus of the torque applied to its two wheel assemblies by way of the belt, pulley, and gear drive above referred to; the work-tool being mounted between the two wheel assemblies. The drive from the axle to each wheel assembly commonly consists of a pair of pawls biased (by springs or the like) into driving relationship to a ratchet-toothed ring constituting an integral part of the wheel assembly; the said ratchet ring being thus capable of over-running the pawls whenever the operator desires to advance one wheel assembly faster than the other, as in turning a corner, or the end of a row of plants. On the other hand, if the operator desires to operate the vehicle in reverse, he cannot do so; for, as the pawls can drive in only one direction there is no axle-reversing gear included in the transmission. Moreover, it can be rolled in reverse only by driving the axle assembly in reverse along with it, for the pawls remain engaged to the ratchet teeth and thus prevent over-running. As a result, even the backward rolling of the wheel assemblies, by manual effort, can be accomplished only by the expenditure of sufficient muscular effort to produce reverse rotation of the transmission gear train and belt pulley clutch.

The present invention provides means for making possible the backward operation of such a vehicle by power, as well as the backward over-running of the wheel-assemblies, with as much ease as attends the forward power operation, or the forward differential rolling of such wheel assemblies.

More specifically, an object of the present invention is to provide wheel assembly drive adapted for actuation in two directions from a reversible engine-driven axle, there being two independent sets of driving pawls, so inter-related with a ratchet-toothed ring as to constitute alternately operative driving and over-running connections; the one set being effective both to drive and to permit over-running in the forward direction of the vehicle, and the other set being similarly effective in the rearward direction of the vehicle.

A second object of the invention is to provide, in a reversible power drive for a wheel assembly having two sets of alternately operative driving pawls of the character indicated, novel means for rendering the correct set of pawls operative automatically, for each direction of axle rotation; optional manual and semi-manual controls being also included within the scope of the invention as illustrated in the attached drawings wherein.

Figure 1:
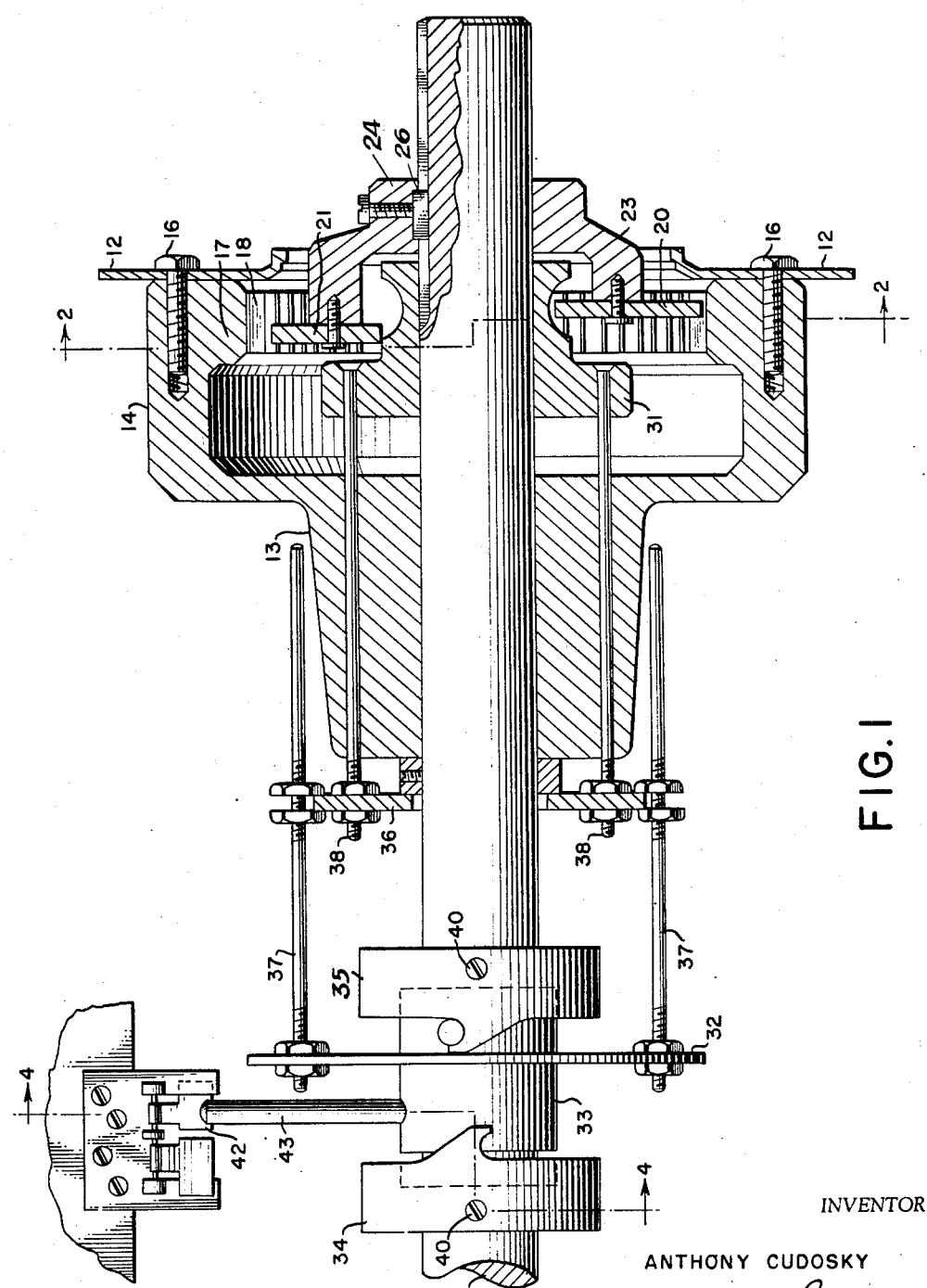
Fig. 1 is a longitudinal sectional view of one wheel assembly of the vehicle; the view also including the driving axle and the mechanism on the driving axle for controlling the operation of said wheel assembly.
Figure 2:
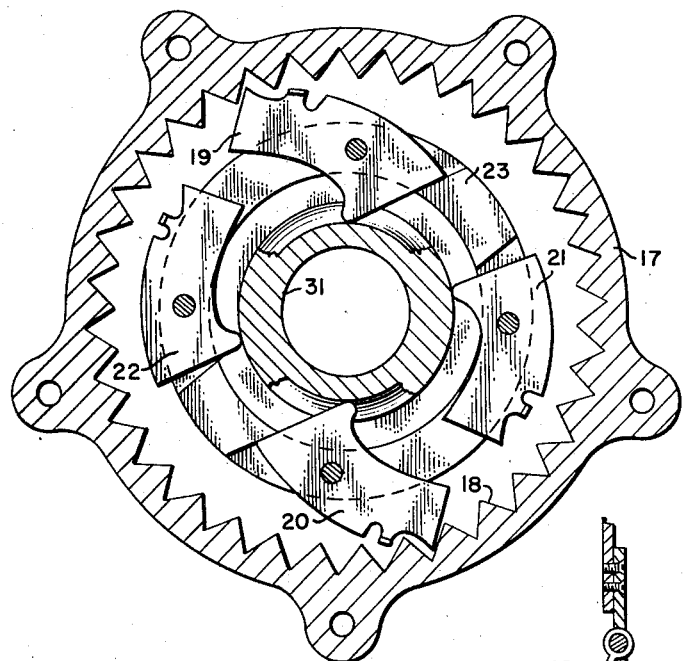
Fig. 2 is a transverse sectional view along line 2—2 of Fig. 1.
Figure 3:
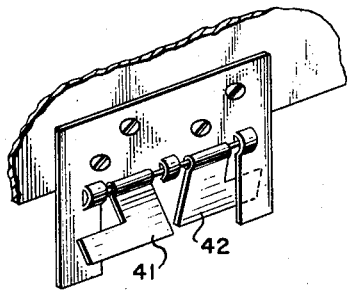
Figure 4:
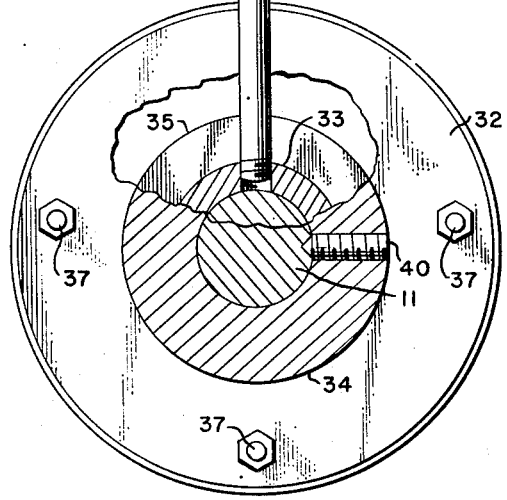
Figure 5:
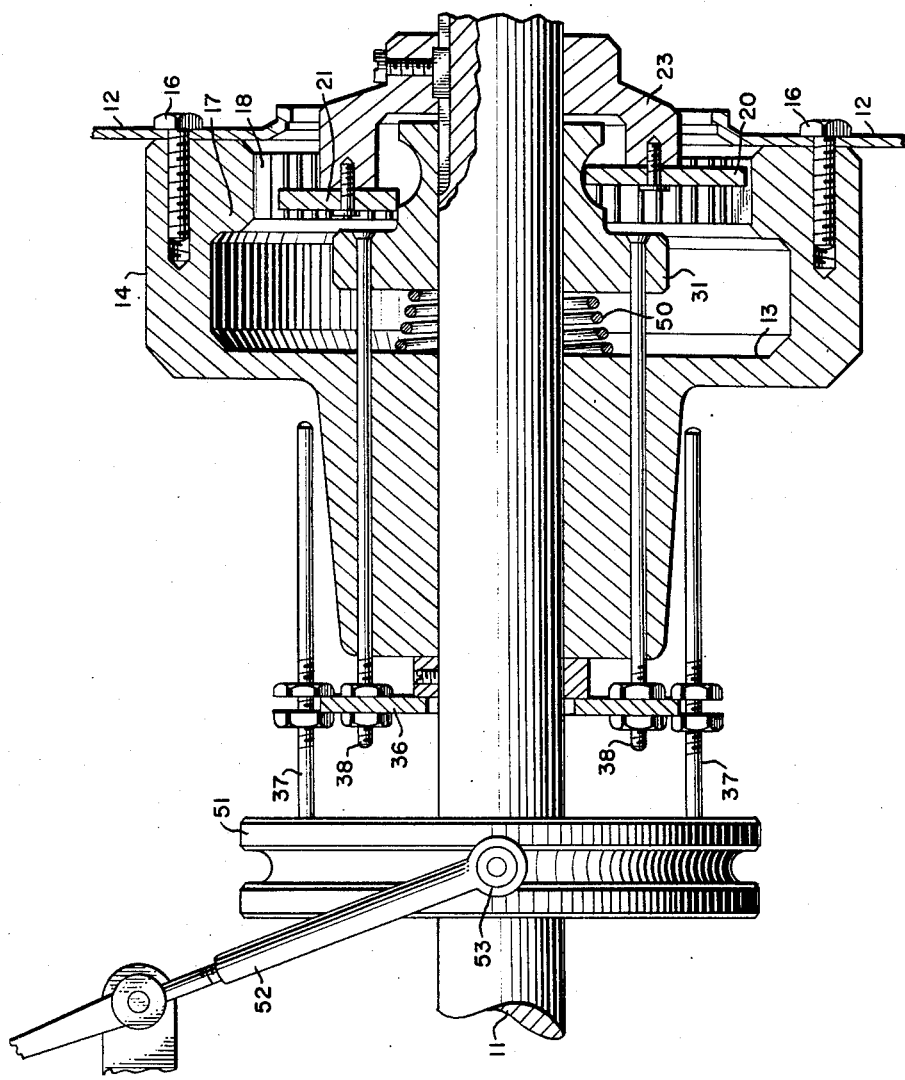

Figs. 3 and 4 are perspective and transverse views along line 4—4 of Fig. 1; and Fig. 5 illustrates how the automatic control of Figs. 1, 2, and 3 may be modified to either a manual or a semi-manual control, if either such type is preferred.

Referring first to Figs. 1, 2 and 3, the driving axle is indicated at 11, this being the axle for driving the wheel assemblies 12 shown in Fig. 1. Included in each wheel assembly 12 is a hub 13 having a series of bosses 14 (Figs. 1 and 2) through which pass the machine screws or bolts 16 for anchorage of the wheel tire rim to said hub. Also formed on the hub 13 is an inner rim portion 17 whose circular face is toothed as indicated at 18, to form a two-directional ratchet ring engageable by one or the other (alternately) of two sets of pawls, one set being shown at 19 and 20, the other at 21 and 22. The novel inter-relationship and control of these two sets of pawls will now be described.

All four pawls are pivotally mounted on a driving carrier 23 whose hub 24 is keyed to the axle 11, as indicated at 26; the pawl-carrying portion of the element 23 being of graduated thickness, so that the pawls 19 and 20 swing in a plane that is laterally offset from the plane of oscillation of the pawls 21 and 22. This lateral offsetting is clearly shown in Fig. 1. Also as shown in Fig. 1, the width of the teeth of ratchet ring 18 is sufficient to embrace both planes just referred to, hence either set of pawls is engageable with the ratchet teeth, according to conditions prevailing at any given moment, as will now be described.

It will be observed (see Fig. 2) that pawls 19 and 20 have their driving edges so directed as to cause counter-clockwise rotation of the hub, while pawls 21 and 22 have their driving edges facing in the opposite direction, to produce clockwise rotation. It will also be noted that the latter two pawls are out of contact with the teeth of ratchet ring 18, whereas pawls 19 and 20 are in contact, and are either driving the hub, or are permitting the hub to over-run counterclockwise, depending upon whether the operator is steering straight ahead, with motive power applied by the axle uniformly to both wheel assemblies, or turning a corner wherein one wheel only is being power-driven and the other over-runs in differential fashion. All four pawls are spring-biased to ratchet-engaging positions, but alternate pawls are restrained from such engagement by the camming action of a sloping shoulder formed on a cam-sleeve 31 (see Fig. 1) that is slidable axially along the axle 11 in response to corresponding axial shifting of a plate 32 forming part of a shift-sleeve 33; the latter also being slidable on the axle 11, between two actuating collars 34 and 35 pinned (at 40) securely to the axle 11 for rotation therewith. An adjustable coupling plate 36 is provided between the plate 32 and the cam-sleeve 31, and rods 37 and 38 link the plate 36 with the plate 32 and the cam-sleeve 31 respectively.

The automatic shifting of the sleeve 33, in response to reversal of axle rotation, is accomplished by the action of the two check-gates illustrated best in Fig. 3; the check-gate 41 being adapted to block passage of the radially projecting pin 43 (Fig. 1) when the latter attempts to rotate past it in one direction, and the check-gate 42 being adapted to block passage of the same pin 43 when it attempts to rotate past it in the opposite direction. In either case, the blockage serves to produce axial shifting of the sleeve 33, by the cam action of the sloping surface of one or the other of the collars 34, 35, as the case may be. Such axial shifting does two things: first, it frees the pin 43 for rotation past the correct gate (41 or 42), and secondly, it produces a corresponding axial shift of cam-sleeve 31, and therefore a reversal of the relationships of pawls 19-22 to the ratchet ring 18. The wheel assembly is accordingly reversed in its direction of rotation, and may now be power driven or over-run in reverse, if occasion requires.

For semi-automatic control, in lieu of the full automatic control just described, the collars 34 and 35, the sleeve 33, the pin 43 and the gates 41, 42 can be omitted, and instead there can be provided a compression spring 50 normally urging the sleeve 31 to the extreme right for forward driving—see Fig. 6. The sleeve can then be manually shifted to the left and held against the compression of spring 50 for reverse drive by a lever 52, whose yoke pins 53 engage the peripheral groove of the ring 51; the latter being integrated with rods 37 and plate 36. When lever 52 is released, compression spring 50 pushes sleeve 31 to forward drive automatically.

For full manual control, the arrangement of Fig. 6 can also be employed, except that spring 50 would be omitted and the lever 52 would be rocked manually in both directions, and held in either extreme position as desired.

What I claim is:

1. In a wheel hub drive, the combination of a single, internally toothed ring integral with the wheel hub, a reversible power-driven axle, a connecting element rotatable with said axle, and fixed in position thereon, two sets of driving pawls, pivotally carried by said connecting element, one set being axially offset from the other, and means including an element slidable on said axle to control the pivotal motions of said pawls and thereby render one of said sets of pawls operative to transmit torque to said wheel hub by way of said toothed ring, to rotate said wheel hub clockwise, with said slidable element in one axial position, said means operating in another axial position to render the other of said sets of pawls operative to transmit torque to said wheel hub to rotate it counterclockwise, and means for maintaining both sets of pawls in their original axial relationships to said internally toothed ring.

2. A wheel hub drive as defined in claim 1, wherein both sets of pawls are disposed within the axial limits of said internally toothed ring.

3. A wheel hub drive as defined in claim 1, wherein said slidable element is in the form of a sleeve surrounding said axle, the thickness of the sleeve being variable in such manner that when a relatively thin section of the sleeve is opposite one set of pawls, a relatively thick section is opposite the other set of pawls, whereby one set of pawls is disengaged from said internally toothed ring, by the action of said relatively thick section of said sleeve, when the other set of pawls is engaged.

References Cited in the file of this patent

UNITED STATES PATENTS

| 642,927 | Schneider | Feb. 6, 1900 |
| 943,744 | Hatfield | Dec. 21, 1909 |
| 981,343 | Willis | Jan. 10, 1911 |
| 1,163,500 | Ball | Dec. 7, 1915 |
| 1,218,613 | Adler | Mar. 6, 1917 |
| 1,254,885 | Clark | Jan. 29, 1918 |
| 1,366,805 | Jex | Jan. 25, 1921 |

FOREIGN PATENTS

| 515,712 | Great Britain | Dec. 12, 1939 |